US011188090B2

(12) United States Patent
Ha et al.

(10) Patent No.: US 11,188,090 B2
(45) Date of Patent: Nov. 30, 2021

(54) AUTONOMOUS DRIVING CONTROL APPARATUS, VEHICLE HAVING THE SAME AND METHOD FOR CONTROLLING VEHICLE

(71) Applicants: HYUNDAI MOTOR COMPANY, Seoul (KR); KIA MOTORS CORPORATION, Seoul (KR); Hyundai Autron Co., Ltd., Seongnam-si (KR)

(72) Inventors: Changwoo Ha, Seoul (KR); Bong Ju Kim, Yongin-si (KR); Ho-Jun Kim, Seoul (KR); Hochoul Jung, Seongnam-si (KR)

(73) Assignees: Hyundai Motor Company, Seoul (KR); Kia Motors Corporation, Seoul (KR); Hyundai Autron Co., Ltd., Seoul (KR)

( * ) Notice: Subject to any disclaimer, the term of this patent is extended or adjusted under 35 U.S.C. 154(b) by 271 days.

(21) Appl. No.: 16/425,445

(22) Filed: May 29, 2019

(65) Prior Publication Data

US 2020/0201349 A1    Jun. 25, 2020

(30) Foreign Application Priority Data

Dec. 24, 2018    (KR) .................. 10-2018-0168130

(51) Int. Cl.
*G05D 1/02* (2020.01)
*G05D 1/00* (2006.01)
*G06K 9/00* (2006.01)
*G08G 1/0968* (2006.01)
(Continued)

(52) U.S. Cl.
CPC ......... *G05D 1/0246* (2013.01); *G05D 1/0088* (2013.01); *G05D 1/0214* (2013.01); *G06K 9/00805* (2013.01); *G06K 9/00832* (2013.01); *G06K 9/4647* (2013.01);
(Continued)

(58) Field of Classification Search
CPC .. G05D 1/0246; G05D 1/0088; G05D 1/0214; G05D 2201/0213; G06K 9/00805; G06K 9/00832; G06K 9/4647; G08G 1/096855; G08G 1/163; G08G 1/164; G08G 1/165; G08G 1/166; H04N 5/247; H04N 19/176; B60W 30/08; B60W 40/00
See application file for complete search history.

(56) References Cited

U.S. PATENT DOCUMENTS 9,646,428 B1 *   5/2017  Konrardy ............. B60W 30/16
2009/0323950 A1 * 12/2009 Nakagata ............... G09C 5/00
                                                                380/243
(Continued)

*Primary Examiner* — Marthe Y Marc-Coleman
(74) *Attorney, Agent, or Firm* — Mintz Levin Cohn Ferris Glovsky and Popeo, P.C.; Peter F. Coriess

(57) ABSTRACT

A vehicle includes a first image obtainer configured to obtain an external image; a second image obtainer configured to obtain an internal image; an obstacle detector configured to detect obstacles; a controller configured to control autonomous driving based on obstacle detection information detected by the obstacle detector and image data obtained by the first image obtainer and encrypt brightness data among the image data obtained by the first and second image obtainers during the control of the autonomous driving; and a storage configured to store the encrypted brightness data.

12 Claims, 7 Drawing Sheets

(51) Int. Cl.
*G06K 9/46* (2006.01)
*H04N 5/247* (2006.01)

(52) U.S. Cl.
CPC ............... *G08G 1/096855* (2013.01); *G05D 2201/0213* (2013.01); *H04N 5/247* (2013.01)

(56) References Cited

U.S. PATENT DOCUMENTS

| | | | | |
|---|---|---|---|---|
| 2011/0317935 | A1* | 12/2011 | Anan | G09C 5/00 382/274 |
| 2014/0226010 | A1* | 8/2014 | Molin | G07C 5/008 348/148 |
| 2014/0325236 | A1* | 10/2014 | Kim | G06F 21/62 713/189 |
| 2019/0329729 | A1* | 10/2019 | Hilligardt | B60W 50/0098 |

* cited by examiner

AUTONOMOUS DRIVING CONTROL APPARATUS, VEHICLE HAVING THE SAME AND METHOD FOR CONTROLLING VEHICLE

CROSS-REFERENCE TO RELATED APPLICATION(S)

This application is based on and claims priority under 35 U.S.C. § 119 to Korean Patent Application No. 10-2018-0168130, filed on Dec. 24, 2018 in the Korean Intellectual Property Office, the disclosure of which is incorporated by reference in its entirety.

TECHNICAL FIELD

The present disclosure relates to managing and processing an image obtained for autonomous driving of a vehicle.

BACKGROUND

A vehicle is an apparatus that moves on a road. Various devices for protecting passengers, assisting in driving and improving ride comfort are embedded in the vehicle.

In recent years, a study on an autonomous driving control apparatus configured to enable the vehicle to autonomously travel to a destination by controlling the vehicle itself to recognize a road environment and determine a driving condition and travel along a planned driving path is being vigorously carried out.

The autonomous driving control apparatus recognizes a change in position of an obstacle and a lane and enables the vehicle to drive in a safe lane while avoiding the obstacle based on the recognized information.

SUMMARY

Therefore, it is an aspect of the present disclosure to provide an autonomous driving control apparatus capable of encrypting and storing image data or transmitting encrypted image data to a server when a driving condition is an accident risk condition, a vehicle having the same, and a method for controlling the vehicle.

It is another aspect of the present disclosure to provide an autonomous driving control apparatus capable of encrypting only luminance data among image data, a vehicle having the same, and a method for controlling the vehicle.

It is another aspect of the present disclosure to provide an autonomous driving control apparatus capable of encrypting only image data corresponding to a direction in which an accident risk condition occurs, a vehicle having the same, and a method for controlling the vehicle.

Additional aspects of the disclosure will be set forth in part in the description which follows and, in part, will be obvious from the description, or may be learned by practice of the disclosure.

In accordance with an aspect of the present disclosure, an autonomous driving control apparatus includes: a communicator configured to communicate with an image obtainer for obtaining an external image of the surroundings of a vehicle and an internal image of the vehicle and communicate with an obstacle detector for detecting obstacles; a controller configured to control autonomous driving based on obstacle detection information detected by the obstacle detector and image data obtained by the image obtainer and encrypt brightness data among the image data obtained by the image obtainer during the control of the autonomous driving; and a storage configured to store the encrypted brightness data.

The controller may identify a region of interest (ROI) from the image data, identify the sizes of macroblocks divided into different sizes based on the brightness and chrominance of the image data, and encrypt the brightness data of the macroblocks smaller than a predetermined size among the macroblocks within the identified ROI.

The storage may include a first memory and a second memory. The controller may determine whether an accident risk condition is determined based on the obstacle detection information detected by the obstacle detector during the control of the autonomous driving, control the first memory to store the encrypted brightness data in the first memory when it is determined that the accident risk condition is not present, and control the second memory to store the encrypted brightness data in the second memory when it is determined that the accident risk condition is present.

The first memory may be a volatile memory, and the second memory may be a non-volatile memory.

The controller may identify a region of interest (ROI) from the image data and encrypt the brightness data of the identified ROI.

The controller may identify the sizes of the macroblocks divided into different sizes based on the brightness and chrominance of the image data and encrypt the brightness data of the macroblocks smaller than a predetermined size among the identified macroblocks.

The communicator may communicate with a server. The controller may determine whether an accident risk condition is determined based on the obstacle detection information detected by the obstacle detector during the control of the autonomous driving and control the communicator to store the encrypted brightness data in the server when it is determined that the accident risk condition is present.

In accordance with another aspect of the present disclosure, a vehicle includes: a first image obtainer configured to obtain an external image; a second image obtainer configured to obtain an internal image; an obstacle detector configured to detect obstacles; a controller configured to control autonomous driving based on obstacle detection information detected by the obstacle detector and image data obtained by the first image obtainer and encrypt brightness data among the image data obtained by the first and second image obtainers during the control of the autonomous driving; and a storage configured to store the encrypted brightness data.

The controller may identify a region of interest (ROI) from the image data, identify the sizes of macroblocks divided into different sizes based on the brightness and chrominance of the image data, and encrypt the brightness data of the macroblocks smaller than a predetermined size among the macroblocks within the identified ROI.

The storage may include a first memory and a second memory. The controller may determine whether an accident risk condition is determined based on the obstacle detection information detected by the obstacle detector during the control of the autonomous driving, control the first memory to store the encrypted brightness data in the first memory when it is determined that the accident risk condition is not present, and control the second memory to store the encrypted brightness data in the second memory when it is determined that the accident risk condition is present.

In accordance with another aspect of the present disclosure, a method for controlling a vehicle includes: controlling autonomous driving of the vehicle based on an external image obtained by a first image obtainer and obstacle detection information detected by an obstacle detector when the vehicle is in an autonomous driving mode; determining whether an accident risk condition is determined based on the obstacle detection information detected by the obstacle detector during the control of the autonomous driving; and encrypting and storing external image data of the vehicle obtained by the first image obtainer and internal image data of the vehicle obtained by a second image obtainer, respectively, when it is determined that the accident risk condition is present.

The encrypting of the external image data of the vehicle may include identifying a region of interest (ROI) from the external image data of the vehicle; identifying the sizes of macroblocks divided into different sizes based on the brightness and chrominance of the image data; and encrypting brightness data of the macroblocks smaller than a predetermined size among the macroblocks within the identified ROI.

The method may further include: identifying a braking force, an acceleration amount, and a steering angle of the vehicle when it is determined that a current position is a highway; storing the encrypted image data in a first memory when a condition that the identified braking force is equal to or greater than a reference braking force, a condition that the identified acceleration amount is equal to or greater than a reference acceleration amount, and a condition that the identified steering angle is equal to or greater than a reference steering angle are not all satisfied; and storing the encrypted image data in the first memory when at least one of the conditions is satisfied.

The encrypting of the external image data may include identifying a direction in which the accident risk condition occurs when it is determined that the accident risk condition is present; and encrypting the brightness data of the image data obtained from at least one camera installed adjacent to the direction corresponding to the identified direction among first, second, third, and fourth cameras that obtain external images of the front, rear, left, and right.

The method may further include: transmitting the encrypted image data in a server when it is determined that the accident risk condition is present.

Another aspect of the invention provides a vehicle comprising: a first camera configured to obtain an external image; a second camera configured to obtain an internal image; an obstacle detector configured to detect obstacles based on information from one or more sensors; a controller configured to control driving of the vehicle based on obstacle detection information detected by the obstacle detector and external image data obtained by the first camera, and to determine, based on the information from the obstacle detector, if an accident risk condition is present or not; and a storage configured to store the image data, and comprising a volatile memory and a non-volatile memory, wherein the controller is configured to encrypt the brightness data of the external image and the internal image and store encrypted image data in the volatile memory, and further configured to store the encrypted brightness data in the non-volatile memory when determined that the accident risk is present and transmit the encrypted image data to a server.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
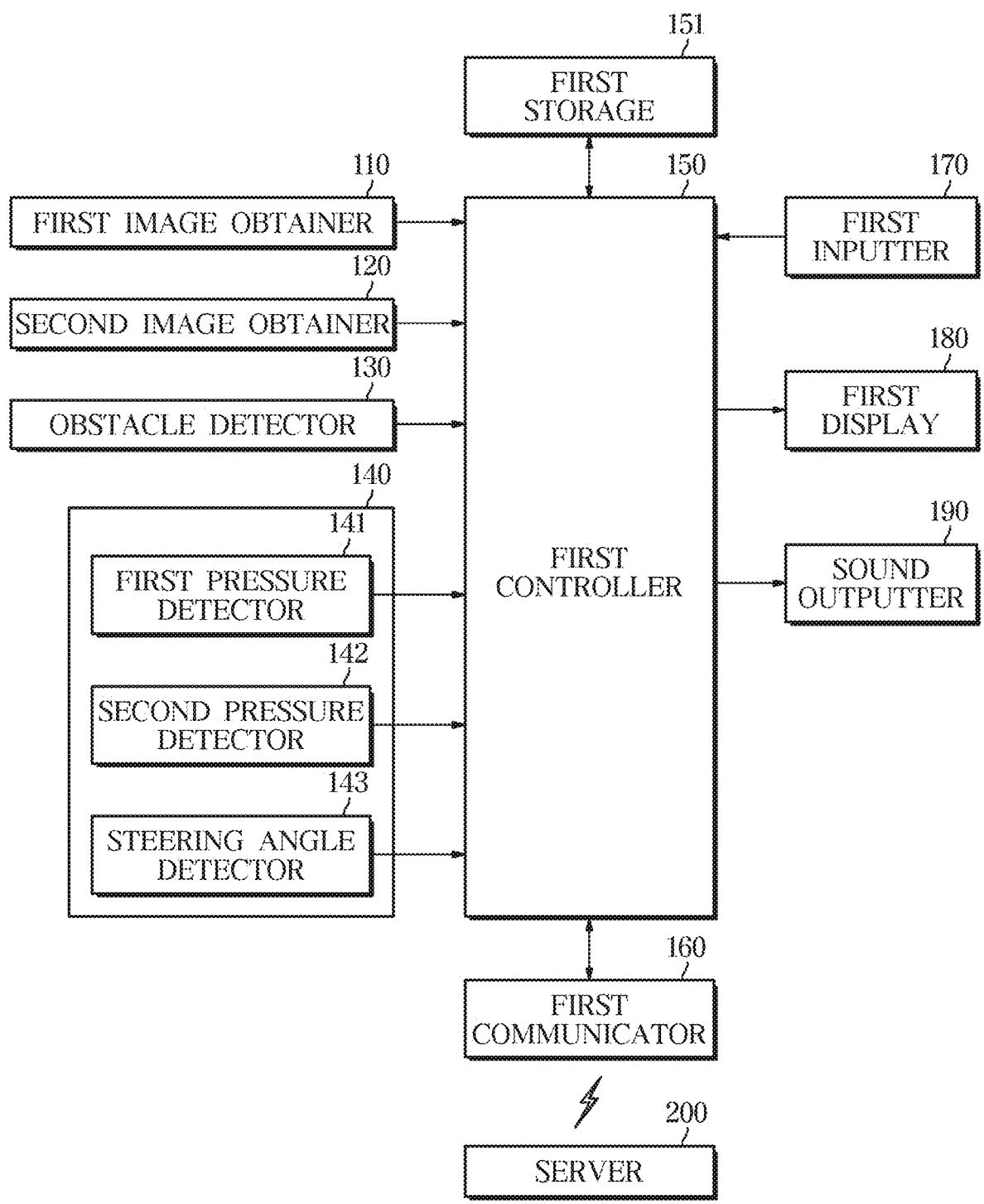
FIG. 1 is a control configuration diagram of a vehicle according to an embodiment.

Embodiments of the invention are now described with reference to the accompanying drawings. The terminology used in the description presented herein is not intended to be interpreted in any limited or restrictive manner, simply because it is being utilized in conjunction with a detailed description of certain embodiments of the invention.

Like reference numerals refer to like elements throughout the specification.

Not all elements of the embodiments of the present disclosure will be described, and the description of what are commonly known in the art or what overlap each other in the embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

In an implementation of an autonomous vehicle, an autonomous driving control apparatus may hand over a driving control right of the vehicle to a driving person when an unexpected condition occurs during autonomous driving of the vehicle. In this situation, it would be difficult to determine the cause of an accident when an accident occurs.

FIG. 1 is a control configuration diagram of a vehicle according to an embodiment.

A vehicle of the present embodiment may be capable of autonomous driving and include an autonomous driving control apparatus.

In addition, the vehicle may drive based on a driver's operation when a manual driving mode is selected by the driver. Further, the vehicle may hand over a driving control right to control the driving to the driver when an unexpected condition occurs during the execution of an autonomous driving mode.

The vehicle may change its driving mode to the manual driving mode perform driving under the manual driving mode when handing over the driving control right to control the driving to the driver.

The vehicle capable of autonomous driving may include a vehicle body having an exterior and an interior and a chassis configured to occupy the remaining portions except for the vehicle body to have mechanical devices required for driving installed thereon.

In one implementation, the exterior of the vehicle body may include a front panel, a bonnet, a roof panel, a rear panel, front-left, front-right, rear-left, and rear-right doors, a window configured at the front-left, front-right, rear-left, and rear-right doors to be opened and closed, a front windshield (or front glass) for securing a front view, and a rear windshield (or rear glass) for securing a rear view.

The interior of the vehicle body may include seats on which passengers sit, a dashboard, a center fascia, and a head unit, and the like.

The vehicle may further include a steering wheel of a steering device for adjusting a driving direction, a brake pedal pressed by the driver in response to the driver's braking intention, and an accelerator pedal pressed by the driver in response to the driver's acceleration intention. In addition, depending on the type of vehicle, the vehicle may further include a clutch pedal.

The vehicle may include a first image obtainer or image capture system 110, a second image obtainer or image capture system 120, an obstacle detector 130, a driving operation information detector 140, a first controller 150, a first storage 151, a first communicator 160, a first inputter 170, a first display 180, and a sound outputter or speaker 190.

The first image obtainer 110 may obtain an image of a road on which the vehicle is driving on. The first image obtainer 110 may obtain the image of the road ahead of the vehicle.

The first image obtainer 110 may be a camera or an Ethernet camera capable of communicating.

The first image obtainer 110 may include a charge-coupled device (CCD) or a complimentary metal-oxide semiconductor (CMOS) image sensor and may include a 3D spatial recognition sensor such as a KINECT (RGB-D Sensor), a TOF (Structured Light Sensor), a stereo camera, and the like.

The first image obtainer 110 may be provided on an inner side of the vehicle, and may be provided to face the outside of the vehicle so as to capture the outside of the vehicle. The first image obtainer 110 may be provided on a front windshield or a room mirror.

The first image obtainer 110 may be provided to be exposed to the outside of the vehicle. The first image obtainer 110 may be provided on the roof panel.

The first image obtainer 110 may be a camera of a black box or a camera of the autonomous driving control apparatus provided for autonomous driving.

The first image obtainer 110 may capture the environment outside the vehicle itself, particularly one or more images of a road environment on which the vehicle drives, at a current position of the host vehicle itself, capture one or more images of an obstacle in front of the vehicle itself, convert the captured information into an electrical signal, obtain image data corresponding to the converted electrical signal, and transmit the obtained image data to the first controller 150.

In addition, the first image obtainer 110 may include a first camera for obtaining the image of the front of the host vehicle and further include at least one of a second camera for obtaining the image of the rear of the vehicle as well as the first camera and a third camera and a fourth camera for obtaining images of the left and right sides of the vehicle.

The second camera may be a rear camera.

Accordingly, the first image obtainer 110 may capture obstacles and road environments on the rear, left and right sides of the vehicle itself, convert the captured information into an electrical signal, obtain the image data corresponding to the converted electrical signal, and transmit the obtained image data to the first controller 150.

The second image obtainer 120 may obtain images of the driver.

The second image obtainer 120 may obtain images of the driver's face and the driver's eyes among the images of the driver.

It is also possible for the second image obtainer 120 to obtain images of a driver's seat as well as a passenger's seat and a rear seat.

The second image obtainer 120 may be a camera or an Ethernet camera capable of communicating.

The second image obtainer 120 may include the CCD or the CMOS image sensor.

The second image obtainer 120 may be provided on the front windshield or the room mirror, and may be provided to face the driver.

The second image obtainer 120 may capture the environment inside the vehicle, convert the captured information into an electrical signal, obtain the image data corresponding to the converted electrical signal, and transmit the obtained image data to the first controller 150.

The obstacle detector 130 may detect the presence and position of one or more obstacles around the host vehicle. Here, the position may include a distance and the direction with respect to the vehicle.

More particularly, the obstacle detector 130 may detect an obstacle positioned outside the host vehicle itself, for example, a vehicle driving in front of the host vehicle, another vehicle approaching from an opposite lane, and a stationary object such as a structure installed in the surroundings of the road.

The obstacle detector 130 may detect the obstacle positioned on the front, rear, left, and right sides of the vehicle itself.

The obstacle detector 130 may be provided on at least one of the front panel, the roof panel, and the rear panel of the vehicle.

The obstacle detector 130 may include a radio detecting and ranging (RaDAR) sensor or a light detection and ranging (LiDAR) sensor.

The RaDAR sensor is a sensor that detects the position and distance of an object by using reflected waves generated by the radiation of radio waves when transmitting and receiving is performed in the same place.

The LiDAR sensor is a contactless distance detection sensor using a principle of laser radar.

Since the LiDAR sensor has higher detection accuracy in a lateral direction than the RaDAR sensor, it can improve the accuracy of the process of determining whether there is a passage in front.

Here, the laser may be a single laser pulse.

The obstacle detector 130 may include an ultrasonic sensor or the RaDAR sensor.

The ultrasonic sensor may generate an ultrasonic wave for a certain time and then detect the signal reflected from the object.

The ultrasonic sensor may be used to determine the presence of obstacles such as pedestrians within a short range.

The driving operation information detector 140 may detect the operation information operated by the driver.

The driving operation information detector 140 may detect the operation information corresponding to the driver's braking intention, the driver's acceleration intention, and the driver's steering intention in the manual driving mode.

The driving operation information detector 140 may detect the operation information corresponding to the driver's braking intention, the driver's acceleration intention, and the driver's steering intention when handing over the control right during the autonomous driving mode.

In addition, the driving operation information detector 140 is also capable of detecting the operation information corresponding to the driver's braking intention, the driver's acceleration intention, and the driver's steering intention by the driver's intervention in the autonomous driving mode.

The driving operation information detector 140 may include a first pressure detector 141, a second pressure detector 142, and a steering angle detector 143.

The first pressure detector 141 may detect a pressure applied to the brake pedal and output pressure information corresponding to the detected pressure.

The first pressure detector 141 may include at least one of a pressure sensor and a position sensor.

The second pressure detector 142 may detect the pressure applied to the accelerator pedal and output the pressure information corresponding to the detected pressure.

The second pressure detector 142 may include at least one of the pressure sensor and the position sensor.

The steering angle detector 143 may detect a steering angle of the steering wheel for recognizing the driving direction of the vehicle and output steering angle information corresponding to the detected steering angle.

The steering angle detector 143 may include an angular velocity sensor for detecting the steering angular velocity of the steering wheel, and may include a yaw rate sensor for detecting a yaw moment of the vehicle.

The vehicle may further include a torque detector for detecting a steering torque applied to the steering wheel or the steering torque outputted from the steering device.

The first controller 150 may be an autonomous driving control apparatus for controlling autonomous driving.

When the first controller 150 is the autonomous driving control apparatus for controlling autonomous driving, the first controller 150 may perform communication with the first and second image obtainers 110 and 120 and the obstacle detector 130 through the first communicator 160.

The first controller 150 may also include the autonomous driving control apparatus for controlling autonomous driving.

The first controller 150 may identify current position information and destination information when the driving mode is the autonomous driving mode, generate a path from a current position to a destination based on the identified current position information and the destination information, and control autonomous driving based on the generated path.

The first controller 150 may request the driver to select a plurality of paths when the plurality of paths are generated and control autonomous driving based on any one of the inputted paths when a selection command of one of the paths is input from the driver.

The first controller 150 may also control the output of the path information to the destination. For example, the first controller 150 may generate navigation information so as to drive on the selected path and control the output of the generated navigation information.

The first controller 150 may control the first display 180 to display the path from the current position to the destination on a map, control the first display 180 to display path guidance information from the current position to the destination, and at the same time may control the operation of the sound outputter 190 so that the path guidance information is output as sound.

The first controller 150 may display the images of the vehicle itself obtained by the first image obtainer 110 in the front, rear, left, and right directions during the autonomous driving mode, and may display the map information and the path guidance information matched with the path in cooperation with the navigation mode.

The first controller 150 may control the driving at a predetermined speed or at a speed selected by the driver in autonomous driving control.

The vehicle may further include a speed detector for detecting the driving speed of the vehicle itself. The speed detector may include a plurality of wheel speed sensors respectively provided on a plurality of wheels of the vehicle, and may include an acceleration sensor for detecting an acceleration of the vehicle.

When the image data of the image obtained in the first image obtainer 110 is received, the first controller 150 may process the received image data to recognize the lane on the road and recognize a driving lane based on position information of the recognized lane and control autonomous driving along the recognized driving lane so as to control the steering of the vehicle based on the path and to control a power device and the braking device so that the detected speed follows the predetermined speed.

The first controller 150 may identify the positions of another vehicle driving in the lane between the left and right directions of the lane itself and the obstacle based on the distance information from the obstacle detected by the obstacle detector 130 when the vehicle is in the autonomous driving mode, identify the distances corresponding to the positions of another vehicle and the obstacle, and adjust the speed of the vehicle itself based on the distances from the identified another vehicle and the obstacle. This makes it possible to prevent a collision with the obstacle.

The first controller 150 may encrypt and store brightness data of the image data obtained by the first and second image obtainers 110 and 120 in the autonomous driving mode.

The first controller 150 may determine whether the current driving condition is an accident risk condition based on the detection information of the obstacle detected by the obstacle detector 130 in the autonomous driving mode. When it is determined that the current driving condition is the accident risk condition, the first controller 150 may encrypt and store the brightness data of the image data obtained by the first and second image obtainers 110 and 120.

More particularly, the first controller 150 may obtain the driving speed of the vehicle itself based on the detection information detected by the speed detector, obtain at least one of the relative distance and the relative speed with respect to the obstacle based on the obtained driving speed of the vehicle itself and the distance to the obstacle, and determine whether there is the accident risk due to possible collision with the obstacle based on at least one of the obtained relative distance and the relative speed.

The first controller 150 may determine that there is the accident risk due to the collision with the obstacle when at least one of the relative distance with the obstacle is less than or equal to a reference relative distance and the relative speed with the obstacle is equal to or greater than a reference relative speed is satisfied.

The first controller 150 may obtain a collision forecast time (TTC; Time To Collision) between the vehicle itself and the obstacle based on the relative distance and the relative speed with the obtained obstacle and determine that there is the accident risk due to collision with the obstacle when the obtained TTC is less than or equal to a reference collision time.

When it is determined that the accident risk condition is present, the first controller 150 may store the detection information of the obstacle.

When determining whether or not there is the accident risk, the first controller 150 may identify at least one of the accident risk corresponding to the relative distance with the obstacle, the accident risk corresponding to the relative speed with the obstacle, and the accident risk corresponding to the TTC with the obstacle. The first controller may compute the degree or value of the accident risk, and may hand over or transfer the driving control right to the driver when the identified risk degree is equal to or greater than a reference risk degree.

The first controller 150 may stop autonomous driving control from the current position to the destination when the driving control right is transferred to the driver, and control the driving of the vehicle based on the operation information transmitted from the brake pedal, the accelerator pedal, and the steering wheel.

The first controller 150 may control at least one of the first display and the sound outputter to output handing over information of the driving control right when the driving control right is transferred to the driver.

The first controller 150 may identify a braking force, an acceleration amount, and the steering angle during the control of autonomous driving. When the identified braking force is equal to or greater than a reference braking force, the first controller 150 may determine that the vehicle is in the accident risk condition. When the identified acceleration amount is equal to or greater than a reference acceleration amount, the first controller 150 may determine that the vehicle is in the accident risk condition. When the identified steering angle is equal to or greater than a reference steering angle, the first controller 150 may determine that the vehicle is in the accident risk condition.

The first controller 150 may identify the braking force, the acceleration amount, and the steering angle when the current position of the vehicle is on a highway, and determine that the vehicle is in the accident risk condition when at least one of the identified braking force is equal to or greater than the reference braking force, the identified acceleration amount is equal to or greater than the reference acceleration amount, and the identified steering angle is equal to or greater than the reference steering angle is satisfied.

Figure 2:
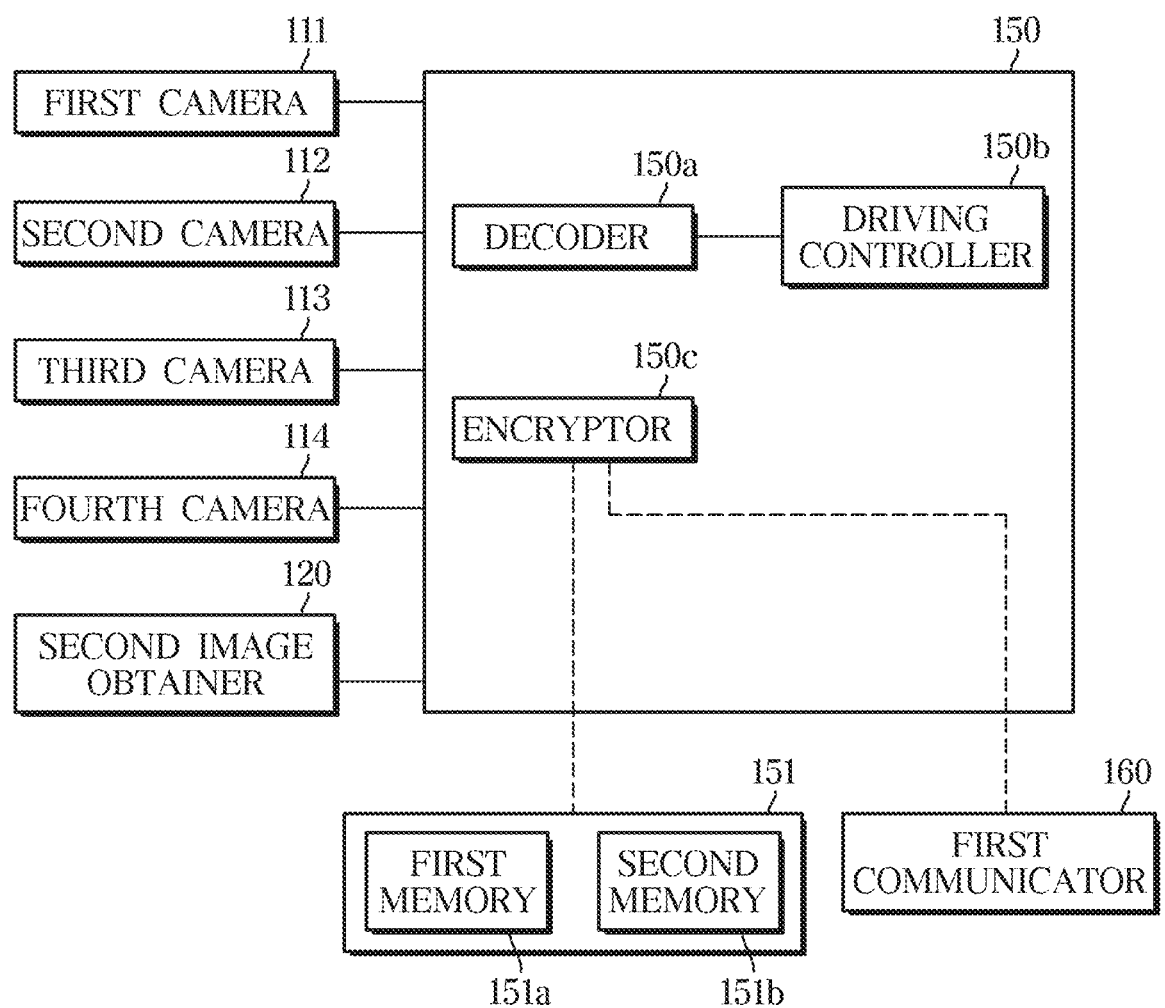
FIG. 2 is a detailed configuration diagram of a controller of the vehicle according to an embodiment.

As illustrated in FIG. 2, when first, second, third, and fourth cameras 111, 112, 113, and 114 that obtain front, rear, left, and right images are provided on the vehicle, the first controller 150 may include a decoder 150*a* for decoding the images obtained by the first, second, third, and fourth cameras 111, 112, 113, and 114 of the first image obtainer 110, a driving controller 150*b* for performing lane recognition and obstacle recognition based on the decoded image data, and controlling autonomous driving based on the recognized lane information and the recognized obstacle information, and an encryptor 150*c* for encrypting the image data obtained by the first, second, third and fourth cameras 111, 112, 113, and 114 of the first image obtainer 110 and transmitting the encrypted image data to at least one of the first storage 151 and the first communicator 160. The encryptor may be an encoder.

Here, the first, second, third, and fourth cameras 111, 112, 113, and 114 of the first image obtainer 110 may encrypt the obtained image data with the Ethernet camera and transmit the encrypted image data to the decoder 150*a* of the first controller 150.

When transmitting an image data packet, the first, second, third, and fourth cameras 111, 112, 113, and 114 may generate network abstraction layer (NAL) information for abstracting information about the image data to be transmitted, generate the image data packet including the NAL information, and transmit the packet of the generated image data through network communication.

For example, the first, second, third, and fourth cameras 111, 112, 113, and 114 may efficiently transmit images by transmitting them in the packet known as a NAL unit.

The image data received by the first controller 150 may be a stream composed of the NAL units.

Accordingly, the decoder 150*a* of the first controller 150 may decode the received image data in the form of data recognizable by the vehicle for autonomous driving.

Here, the four pieces of image data obtained for 60 seconds at the same time and decoded in the decoder 150*a* may have a quantity of 1 Mpixel×1.5 Bytes×3 fps×60 s'4 ch=1080 MBps.

The driving controller 150*b* of the first controller 150 may receive the decoded image data of the first, second, third, and fourth cameras 111, 112, 113, and 114, respectively and perform signal processing of the received image data, change the size and format in order to improve the speed of the signal processing, perform image quality improvement work, and perform a clearing process and a noise removing process. The signal processing may be performed in the decoder 150*a*.

The driving controller 150*b* may recognize the lane from the image data and recognize obstacles from the objects by applying vision techniques for decomposing objects in the image data.

The driving controller 150*b* may identify the size and position of the obstacle based on the image data, calculate the position and the trajectory of the obstacle, and identify whether the obstacle is a bicycle, a pedestrian, a sign, a traffic light, or another vehicle.

The driving controller 150*b* may group point data detected by the obstacle detector 130 to recognize shape information and the position information of the obstacle and to identify the type of the obstacle based on the shape information of the obstacle.

The driving controller 150*b* may recognize the shape information and the position information of the obstacle from the direction, the distance and the amount of points between the vehicle itself and the obstacle.

The driving controller 150*b* may obtain the position information of at least one obstacle based on at least one of the image information obtained by the first image obtainer 110 and the detection information detected by the obstacle detector 130 and obtain the position information of the obstacle for the obstacle having the collision risk based on the position information of the obtained at least one obstacle.

The driving controller 150*b* may recognize whether the braking is necessary, the acceleration is necessary, and the steering is necessary based on the position information of the obstacle and control at least one of the braking, the acceleration and the steering based on the recognized necessary condition.

The driving controller 150*b* may control the operation of the first storage 151 to store the encrypted image data when it is determined that the accident risk is present due to the collision.

The driving controller 150*b* of the first controller 150 may transmit a signal corresponding to the accident risk to the encryptor 150*c*.

The driving controller 150*b* of the first controller 150 may also transmit the signal corresponding to the direction of the accident risk to the encryptor 150*c*.

The encryptor 150*c* may encrypt the image data of the NAL unit transmitted from the first, second, third, and fourth cameras 111, 112, 113, and 114.

Figure 3:
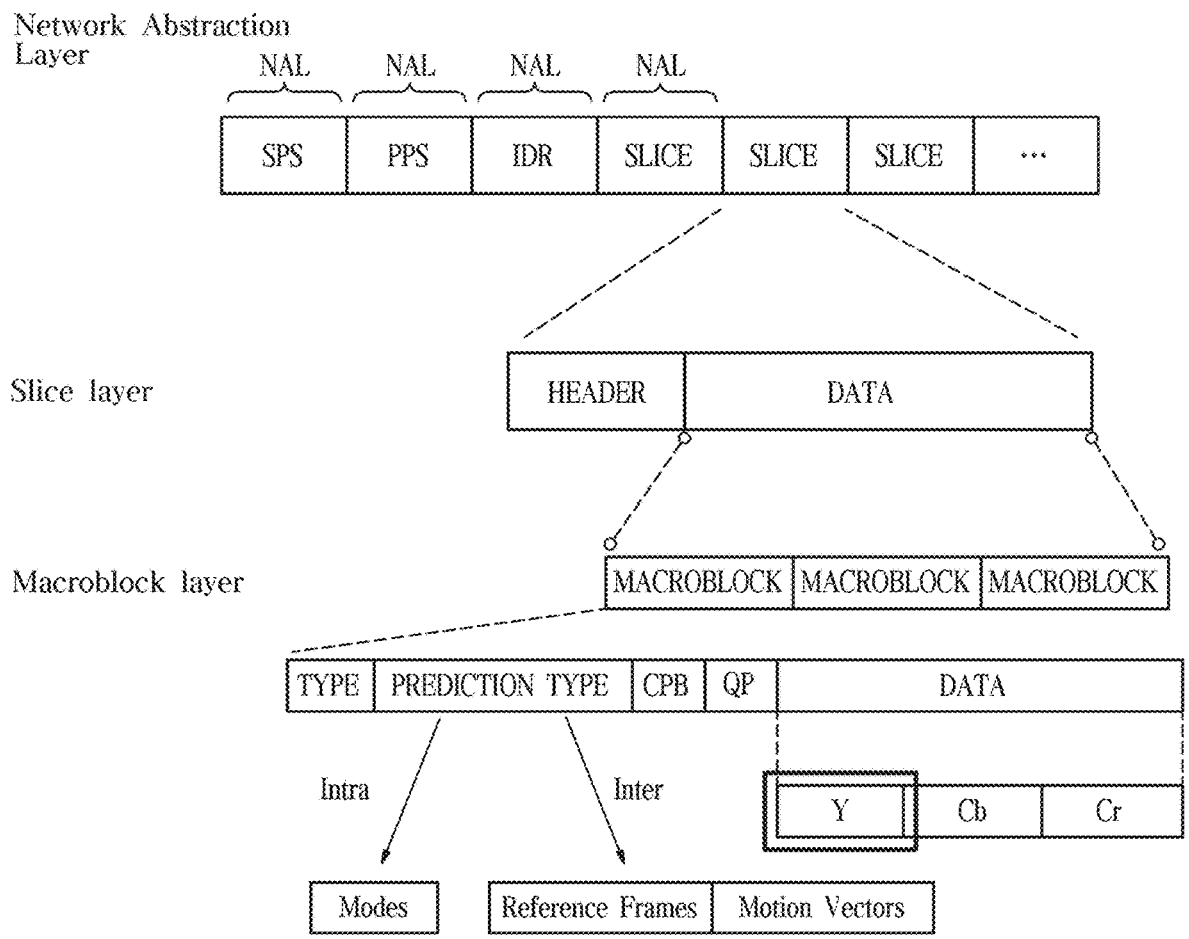
FIG. 3 is a configuration diagram of a network abstraction layer for transmitting an image in a camera provided in the vehicle according to an embodiment.

As illustrated in FIG. 3, the NAL may include the NAL unit and payloads.

Here, the payloads may include a raw byte sequence payload (RBSP). The RBSP may include a parameter set that indicates information such as a sequence parameter set (SPS), a picture parameter set (PPS), and a plurality of slices corresponding to a video coding layer (VCL).

The VCL may perform interface with the outside through the NAL unit.

The plurality of slices may be composed of an Instantaneous Decoding Refresh (IDR) slice and a non-IDR slice, which are a first picture of the image sequence.

Each slice may be composed of a slice layer including a header and data, and the data in the slice layer may include a macroblock layer composed of a plurality of macroblocks.

Here, the macroblock layer may be a basic unit of the image in H.264 as a minimum unit constituting the NAL.

Each macroblock in the macroblock layer is a prediction unit obtained by grouping several pixel blocks for motion compensation and motion prediction. The macroblock may include a type, a prediction type, a coded picture buffer (CPB), a quantization parameter (QP), and data (DATA). Here, the data of the macroblock may include brightness data (Y) and color difference data (Cr, Cb).

Here, the brightness data may have 4×4 and 16×16 pixel blocks, and the color difference data may have 8×8 pixel blocks.

Each of the macroblocks may use different encryption methods. The encryption methods may include DES (Data Encryption Standard), 3DES (Triple Data Encryption Standard), AES (Advanced Encryption Standard), ARIA (Academy Research Institute Agency), Seed (SEED), and HEIGHT (HIGh security and light weight).

For example, encryption may be performed on a macroblock-by-macroblock basis.

All the data of H.264 may be composed of each NAL unit, and each NAL may have a unique serial number.

Figure 4:
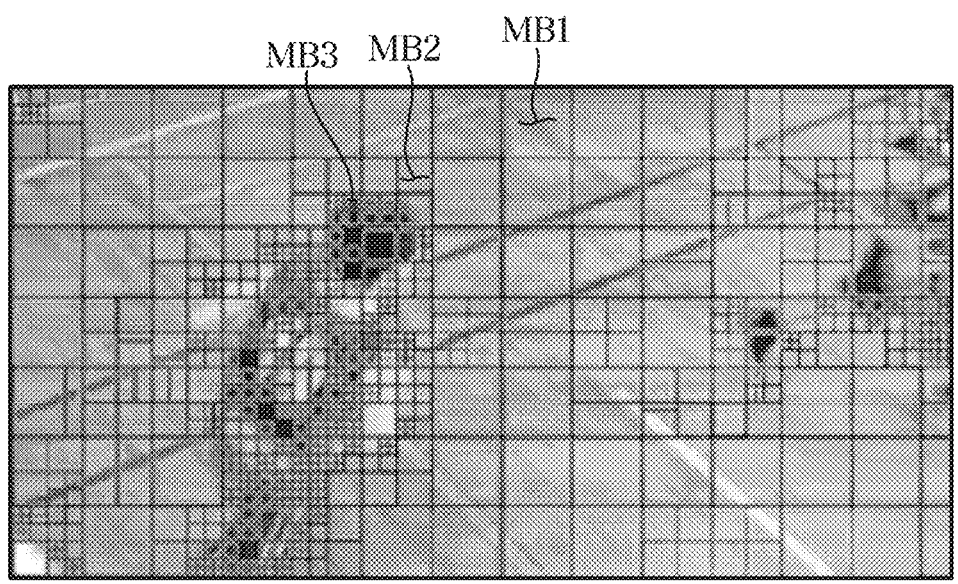
FIG. 4 is a view illustrating a macroblock of image data obtained by the camera provided in the vehicle according to an embodiment.

As illustrated in FIG. 4, the image data received in the encryptor 150*c* of the first controller 150 may be divided into macroblocks of different sizes (MB1, MB2, MB3) depending on the chrominance and brightness.

In addition, the encryptor 150*c* of the first controller 150 may obtain region of interest (ROI) through recognition of the obstacle of the received image data. Information on the ROI may also be provided from the driving controller 150*b*.

When the image data obtained by the first, second, third, and fourth cameras 111, 112, 113 and 114 are respectively received, the encryptor 150*c* may identify the brightness data for each macroblock in the received image data, encrypt only the brightness data for each identified macroblock and store the encrypted image data only for each macroblock in the first storage 151.

When the driving condition of the vehicle is not the accident risk condition, the encryptor 150*c* may store the encrypted image data in a first memory 151*a* of the first storage 151. When the driving condition of the vehicle is the accident risk condition, the encryptor 150*c* may store the encrypted image data in a second memory 151*b* of the first storage 151 and control the first communicator 160 to transmit the encrypted image data to a server 200.

The encryptor 150*c* may receive a store command corresponding to the accident risk condition from the driving controller 150*b*.

The encryptor 150*c* may encrypt the image data obtained by the second image obtainer 120. At this time, only the brightness data per macroblock of the image data obtained by the second image obtainer 120 may be encrypted.

The encryptor 150*c* may encrypt the image data acquired from the first image obtainer 110 and the second image obtainer 120 in different methods.

The encryptor 150*c* may identify the ROI from the image data, identify a macroblock smaller than a predetermined size among the macroblocks in the identified ROI, and encrypt the brightness data of the identified macroblock.

The encryptor 150*c* may identify the ROI from the image data and encrypt the brightness data of the identified ROI.

The encryptor 150*c* may identify the macroblock smaller than the predetermined size among the macroblocks of the image data and encrypt the brightness data of the identified macroblock.

When it is determined that the accident risk condition is present, the first controller 150 may identify the direction in which the accident risk condition occurs and control the encryption of the image data of at least one camera corresponding to the identified direction.

For example, when the accident risk condition is present in the forward direction of the vehicle, the first controller 150 may encrypt the image data obtained by the first camera 111 and store the encrypted image data in the second memory 151*b* and further encrypt the image data obtained by the third and fourth cameras 113 and 114 in the direction adjacent to the forward direction and store the encrypted image data in the second memory 151*b*.

When the accident risk condition is present in the rearward direction of the vehicle, the first controller 150 may encrypt the image data obtained by the second camera 112 and store the encrypted image data in the second memory 151*b* and further encrypt the image data obtained by the third and fourth cameras 113 and 114 in the direction adjacent to the rearward direction and store the encrypted image data in the second memory 151*b*.

When the accident risk condition is present in the right side of the vehicle, the first controller 150 may encrypt the image data obtained by the fourth camera 114 and store the encrypted image data in the second memory 151*b* and further encrypt the image data obtained by the first and second cameras 111 and 112 in the direction adjacent to the right direction and store the encrypted image data in the second memory 151b.

When the occurrence direction of the accident risk condition is the left side of the vehicle, the first controller 150 may encrypt the image data obtained by the third camera 113 and store the encrypted image data in the second memory 151b and further encrypt the image data obtained by the first and second cameras 111 and 112 in the direction adjacent to the left direction and store the encrypted image data in the second memory 151b.

The first controller 150 may encrypt and store all the image data obtained in the second image obtainer 120.

The first controller 150 may determine that there is a secondary accident risk when the accident risk degree is equal to or greater than the reference risk degree, and may encrypt the brightness data of the image data obtained from the first, second, third, and fourth cameras 111, 112, 113, and 114 and store them in the second memory 151b.

The first controller 150 may determine whether the rotation of the vehicle body has occurred based on the difference of the plurality of wheel speeds, and may encrypt the brightness data of the image data obtained from the first, second, third, and fourth cameras 111, 112, 113, and 114 and store them in the second memory 151b when it is determined that the rotation of the vehicle body has occurred.

The first controller 150 may also determine whether rotation of the vehicle body has occurred based on the information detected by a yaw rate detector.

The first controller 150 may also encrypt the brightness data of the image data obtained from the first, second, third, and fourth cameras 111, 112, 113, and 114 so that the overall condition can be grasped when a collision occurs.

The first controller 150 may store the obstacle information detected by the obstacle detector 130 in the second memory 151b of the first storage 151 and control the first communicator 160 to be transmitted to the server when it is determined that the accident risk condition is present.

The first controller 150 may encrypt and store only the brightness data of the image data obtained by the first and second image obtainers 110 and 120 in order to determine the cause of an accident when it is determined that the accident risk condition is present even in the manual driving mode.

The first controller 150 may allow the first controller 150 to drive while adjusting the driving direction of the vehicle and the driving speed of the vehicle based on the operation information of the brake pedal, the accelerator pedal, and the steering wheel when the driving mode is the manual driving mode.

For example, the first controller 150 may control the braking and decelerating of the vehicle based on the pressure information detected by the first pressure detector 141, control the acceleration of the vehicle based on the pressure information detected by the second pressure detector 142, and control the driving direction of the vehicle based on the steering angle information detected by the steering angle detector 143 when the manual driving mode is performed.

The first controller 150 may include a memory storing an algorithm to control encryption and decoding of the image or data about a program that implements the algorithm, and a processor carrying out the aforementioned operation using the data stored in the memory.

The first controller 150 may be an electronic control unit (ECU) controlling at least one of autonomous driving and manual driving of the vehicle, and may be any one of a microcomputer, a CPU, and the processor.

The first controller 150 may be implemented with the memory storing an algorithm to control operation of the components in the vehicle or data about a program that implements the algorithm, and the processor carrying out the aforementioned operation using the data stored in the memory. The memory and the processor may be implemented in separate chips. Alternatively, the memory and the processor may be implemented in a single chip.

The first storage 151 may include the first memory 151a and the second memory 151b.

The first memory 151a may be a volatile memory, and the second memory 151b may be a non-volatile memory.

The first memory 151a may store the encrypted image data during autonomous driving, and the second memory 151b may store the encrypted image data in an accident risk condition.

The second memory 151b may further store the obstacle detection information in the accident risk condition, and may further store date and time information and position information.

The volatile memory may include at least one of S-RAM (S-RAM) and D-RAM (D-RAM).

The non-volatile memory may include at least one of a flash memory, a read only memory (ROM), an erasable programmable read only memory (EPROM), and an electrically erasable programmable read only memory (EEPROM).

The non-volatile memory may further include PROM, EAROM, FeRAM, MRAM, PRAM, SONOS, RRAM, and NRAM.

The first storage 151 may be implemented by at least one of a storage medium such as a hard disk drive (HDD), a compact disk read only memory (CD-ROM), and the like, without being limited thereto.

The first storage 151 may store a predetermined size.

The first storage 151 may store at least one of a reference relative distance, a reference relative speed, and a reference collision prediction time with respect to the obstacle for determining the accident risk condition.

The first storage 151 may further store the accident risk corresponding to the relative distance with the obstacle, the accident risk corresponding to the relative speed with the obstacle, and the accident risk corresponding to the collision expected time.

The first storage 151 may be provided integrally with the first controller 150.

The first storage 151 may be the memory implemented as a separate chip from the processor associated with the first controller 150, or may be the memory implemented as a single chip with the processor.

The first communicator 160 may comprise an antenna.

The first communicator 160 communicates with infrastructure through the antenna and may receive the information transmitted from the server 200 through the infrastructure. For example, the first communicator 160 may communicate with the server 200 through the infrastructure of the road.

The first communicator 160 may communicate with the server 200, the infrastructure and another vehicle.

The first communicator 160 may transmit the control signal of the first controller 150 to the server 200 and transmit various kinds of information transmitted from the server 200 to the first controller 150.

The first communicator 160 may transmit various kinds of information corresponding to the accident risk condition to the server 200. Here, the various kinds of information may include the image data of the first image obtainer 110 obtained in the accident risk condition, the image data of the second image obtainer 120, and may further include driving operation information.

Here, the various kinds of information may further include identification information of the driver, identification information of the vehicle, the detection information of the obstacle, the position information of the vehicle, and the like.

The first communicator 160 may transmit the encrypted brightness data of the image data corresponding to the accident risk condition to the server 200.

The first communicator 160 may also communicate with another vehicle when the autonomous driving mode is performed. The first communicator 160 may receive the information of the surrounding roads from another vehicle.

The first communicator 160 may include one or more components that enable communication with the server 200, the infrastructure and another vehicle, for example, at least one of a short-range communication module, a wired communication module, and a wireless communication module.

The short-range communication module may include various short-range communication modules for transmitting and receiving signals within a short range over a wireless communication network, such as a Bluetooth module, an infrared communication module, a radio frequency identification (RFID) communication module, a wireless local access network (WLAN) communication module, a near field communication (NFC) module, a Zigbee communication module, etc.

The wired communication module may include not only one of the various wired communication modules, such as a controller area network (CAN) communication module, a local area network (LAN) module, a wide area network (WAN) module, or a value added network (VAN) module, but also one of various cable communication modules, such as a universal serial bus (USB), a high definition multimedia interface (HDMI), a digital visual interface (DVI), recommended standard (RS) 232, a power cable, or a plain old telephone service (POTS).

The wired communication module may further include a local interconnect network (LIN) module.

The wireless communication module may include a wireless fidelity (WiFi) module, a wireless broadband (WiBro) module, and/or any wireless communication module for supporting various wireless communication schemes, such as a global system for a mobile communication (GSM) module, a code division multiple access (CDMA) module, a wideband code division multiple access (WCDMA) module, a universal mobile telecommunications system (UMTS), a time division multiple access (TDMA) module, a long-term evolution (LTE) module, etc.

The first communicator 160 may further include a position receiver for receiving the position information corresponding to the current position of the vehicle.

The position receiver may include a Global Positioning System (GPS) receiver.

The GPS receiver may include an antenna module and a signal processor for receiving signals of a plurality of GPS satellites.

The antenna module may be provided on the antenna provided on the exterior of the vehicle.

The signal processor may include software for obtaining the current position using distance and time information corresponding to the position signals of the plurality of GPS satellites and the outputter for outputting the obtained position information of the vehicle.

The first inputter 170 may receive an operation command of various functions of the vehicle.

For example, the first inputter 170 may receive the manual driving mode and the autonomous driving mode during the driving mode, and may input the destination information and the path information.

The first inputter 170 may receive at least one of the store command and a transmission command of the obtained image data at the time of occurrence of the accident risk.

The first inputter 170 may be provided in the head unit or the center fascia, including at least one mechanical button, such as ON/OFF buttons for operation of various functions, buttons to change the settings of various functions, etc.

The first inputter 170 may also include a jog dial or touch pad for a user to input a command to move or select a cursor displayed on the display of a vehicle terminal.

Here, the jog dial or the touch pad may be provided in the center fascia or the like.

The first display 180 may display information about the function being performed in the vehicle, information input by the user, information about the obstacle detection, and collision guidance information.

The first display 180 may display the manual driving mode or the autonomous driving mode, which is a driving mode of the vehicle.

The first display 180 may also display information about notification of handing over of the control right of the vehicle to the driver during the autonomous driving mode as the image.

The first display 180 may be provided in the head unit of the vehicle.

The first display 180 may further include at least one of a display lamp provided in the side mirror, a display lamp provided in the cluster, and a display lamp provided in the interior of the vehicle body.

The first inputter 170 and the first display 180 may be implemented in a terminal.

The vehicle may further include the vehicle terminal for user convenience.

The vehicle terminal may be an audio-video navigation device (AVN) that performs the audio function, the video function, and the navigation function. In addition, the vehicle terminal may further perform at least one of a broadcasting function (DMB function) and a radio function.

The vehicle terminal may display the image of at least one function selected by the user. In addition, in the autonomous driving mode, the vehicle terminal may display the image in the forward, rearward, leftward, and rightward directions and display the position of the obstacle.

The vehicle terminal can display the collision information by using screen colors, characters, emoticons, etc. of the screen.

The vehicle terminal may display a map image within a certain range from the current position of the vehicle when the navigation function is selected and display the map information in which the path information from the current position to the destination is matched when the destination is inputted.

The vehicle terminal may be installed on the dashboard either in a landfill or in a cradle.

The sound outputter 190 may output sound corresponding to the function being performed in the vehicle.

The sound outputter 190 may warn of collision with the obstacle and warn the driver of drowsiness, and output warning information to warn of the danger of the pedal misoperation.

The sound outputter 190 may also output sound notification of handing over or transferring the control right of the vehicle to the driver during the autonomous driving mode.

The sound outputter 190 may include a speaker for outputting sounds such as a warning sound, a guidance sound, and the like.

Figure 5:
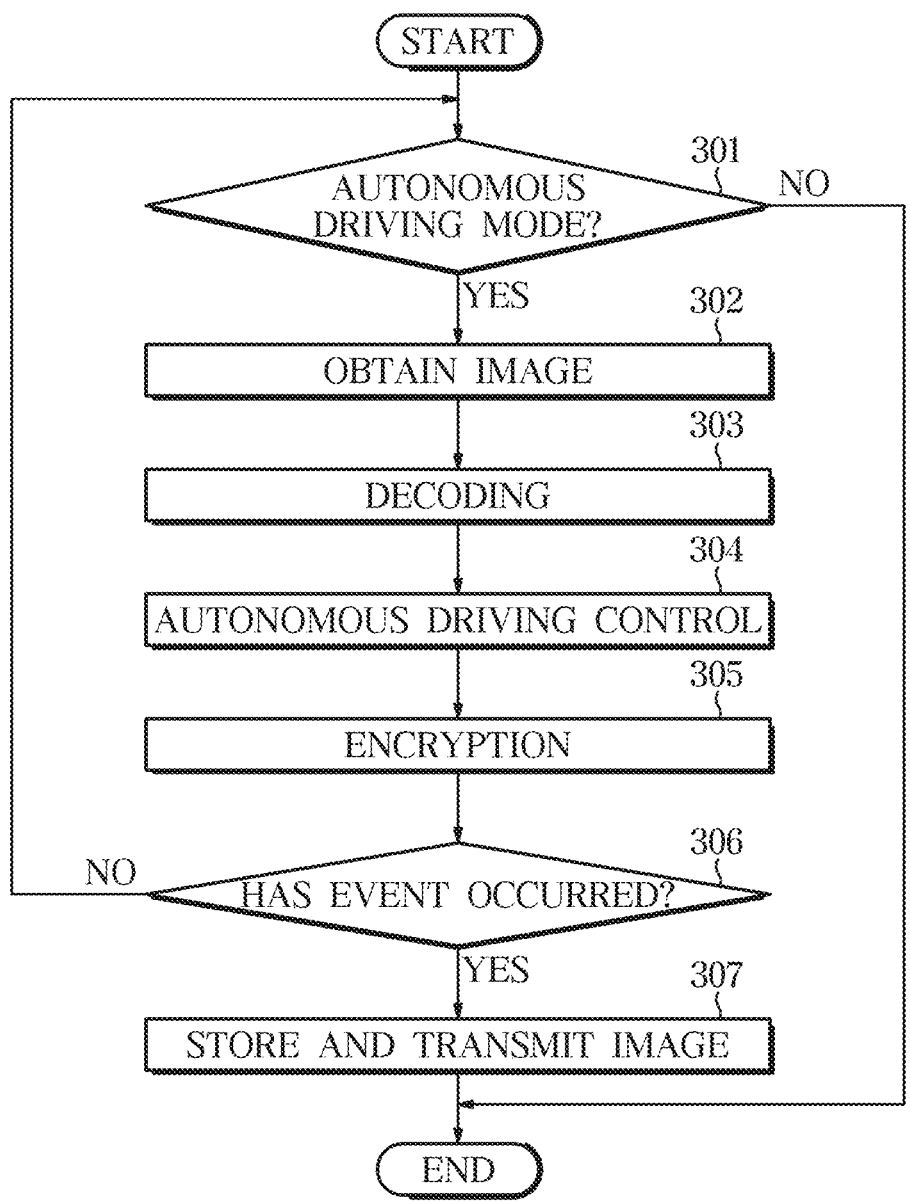
FIG. 5 is a control flowchart of the vehicle according to an embodiment.

FIG. 5 is a control flowchart of the vehicle according to an embodiment.

The vehicle 100 may identify the current position information of the vehicle received by the position receiver when the start of the vehicle 100 is turned on and the autonomous driving mode is selected (301) and display the map on which the current position is matched based on the current position information of the vehicle through the first display 180.

When the destination information is inputted, the vehicle 100 may identify the current position information and the destination information, search for the path information from the current position to the destination based on the identified destination information and current position information, and display the navigation information matching the path on the map through the first display 180.

The vehicle may activate the first image obtainer 110 and the obstacle detector 130 and obtain the image of the outside of the vehicle through the first image obtainer 110 during the autonomous driving (302) and perform decoding of the image obtained by the first image obtainer 110 (303), and recognize the obstacle in the surroundings of the vehicle based on the detection information of the obstacle detected by the obstacle detector 130.

The vehicle may change the size and format of the decoded image data, and may perform the image quality improvement work. In addition, the vehicle may perform the clearing process and the noise removing process on the image data subjected to the image processing.

The vehicle may recognize the obstacle in the image data by applying vision techniques to recognize the object.

The vehicle may obtain the size and position information of the obstacle when the obstacle is recognized and recognize the type of obstacle such as a bicycle, a pedestrian, a sign lamp, a traffic light, a wall, a guard rail, a roadside tree, a street lamp, and another vehicle based on the obtained position information and size information of the obstacle.

The vehicle may recognize the lane in the image data, recognize the lane itself on which the vehicle itself drives on based on the recognized lane, and obtain the position information of front, left, right, and rear obstacles of the vehicle itself based on the recognized lane.

The vehicle 100 may scan the surroundings of the vehicle itself, i.e., the front side, the left side and the right side, based on the detection information detected by the obstacle detector 130 to detect the obstacle. In addition, the vehicle may scan the rear side to detect the obstacle.

In embodiments, the vehicle 100 may control the autonomous driving while recognizing the driving condition based on the image data obtained by the first image obtainer 110 and the detection information detected by the obstacle detector 130 during autonomous driving (304).

The vehicle may encrypt the image data obtained by the first image obtainer 110 and the image data acquired by the second image obtainer 120, respectively (305) and store each piece of encrypted image data in the first memory 151a of the first storage 151.

The vehicle may determine whether the vehicle is in the accident risk condition due to collision with the obstacle, slip of the vehicle, rapid acceleration of the vehicle, quick braking or quick steering or vehicle failure during autonomous driving. For example, the vehicle may determine whether an event corresponding to the accident risk condition has occurred from various sensors of the vehicle such as the obstacle detector 130 (306).

An example of a configuration for determining occurrence of an event will be described.

More particularly, the vehicle may obtain the driving speed of the vehicle itself based on the detection information detected by the speed detector, obtain at least one of the relative distance and the relative speed with respect to the obstacle based on the obtained driving speed of the vehicle itself and the distance to the obstacle, and determine whether there is the accident risk due to collision with the obstacle based on at least one of the obtained relative distance and the relative speed.

The vehicle may determine that there is the accident risk due to the collision with the obstacle when at least one of the relative distance with the obstacle is less than or equal to a reference relative distance and the relative speed with the obstacle is equal to or greater than a reference relative speed is satisfied.

The vehicle may identify the braking force, the acceleration amount, and the steering angle during the control of autonomous driving. When the identified braking force is equal to or greater than the reference braking force, the vehicle may be determined to be in quick braking and determined as the accident risk condition. When the identified acceleration amount is equal to or greater than the reference acceleration amount, the vehicle may be determined to be in rapid acceleration and determined as the accident risk condition. When the identified steering angle is equal to or greater than a reference steering angle, the vehicle may be determined to be in quick steering and determined as the accident risk condition.

The vehicle may identify the braking force, the acceleration amount, and the steering angle when the current position of the vehicle is on a highway, and determine that the vehicle is in the accident risk condition when at least one of the identified braking force is equal to or greater than the reference braking force, the identified acceleration amount is equal to or greater than the reference acceleration amount, and the identified steering angle is equal to or greater than the reference steering angle is satisfied.

The vehicle may be determined to be in the accident risk condition when the slip amount of the vehicle is equal to or greater than a reference slip amount.

When it is determined that an event has occurred, the vehicle may store each piece of encrypted image data in the second memory 151b of the first storage 151 and transmit the encrypted image data to the server 200 (307).

In embodiments, in the autonomous driving mode, the vehicle may encrypt the brightness data of the image data obtained by the first and second image obtainers 110 and 120 and store the brightness data in the first memory 151a. When it is determined that the vehicle is in the accident condition, the vehicle may encrypt the brightness data of the image data obtained by the first and second image obtainers 110 and 120 and store the brightness data in the second memory 151b.

Figure 6:
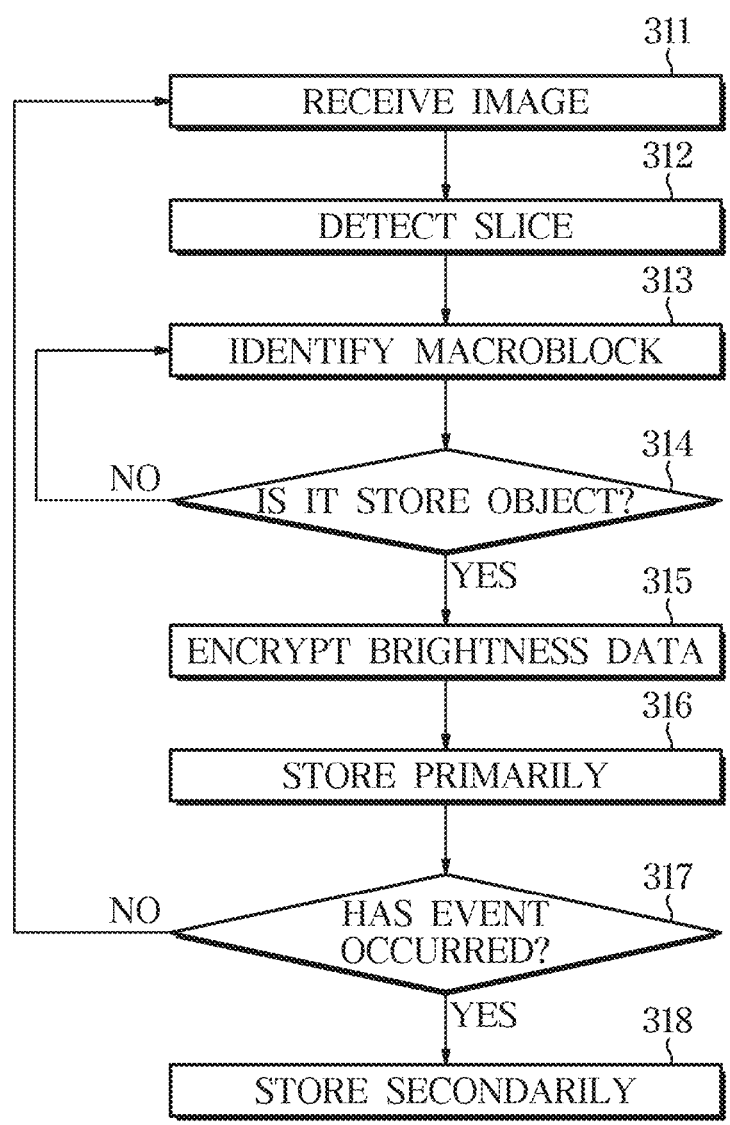
FIG. 6 is a flowchart of encryption and storage of image data of the vehicle according to an embodiment.

A configuration for encrypting and storing the image data will be described with reference to FIG. 6.

The first, second, third, and fourth cameras 111, 112, 113, and 114 may generate the image data of the NAL unit.

Only the configuration for encrypting the brightness data of the image data of the first camera 111 will be described since the configuration for encrypting the brightness data of the image data of the first, second, third, and fourth cameras 111, 112, 113, and 114 is the same.

In the autonomous driving mode, the vehicle may receive the image data obtained by the first camera 111 (311).

The vehicle may detect a slice in the image data of the NAL unit (312) and identify the macroblock in the detected slice (313).

The vehicle may determine whether the identified macroblock is a store object (314).

Here, the determination as to whether or not the store object is to obtain the ROI through recognition of the obstacle in the image data, identify the size of the macroblock included in the obtained ROI, determine whether the size of the identified macroblock is smaller than the predetermined size, and is determined to be the store object when it is determined that the size of the identified macroblock is smaller than the predetermined size.

In addition, it is also possible to determine that the store object is the store object when the number of the macroblocks whose size of the macroblock of the image data smaller than the predetermined size is equal to or greater than a reference number.

It is also possible to determine whether or not the store object is the store object when the ROI exists in the image data.

When it is determined that it is the store object, the vehicle may encrypt only the brightness data (Y component) of the macroblock (315) and primarily store the brightness data in the first memory 151*a* (316).

For example, when it is determined that an event has not occurred, the vehicle may encrypt only the brightness data of the encrypted image data and primarily store the brightness data in the first memory 151*a* of the first storage 151. When it is determined that an event has occurred (317), the vehicle may secondarily store the encrypted image data in the second memory 151*b* of the first storage 151 (318).

When it is determined that the event occurrence is an accident risk condition, the vehicle may identify the direction in which the accident risk condition occurs and control the encryption of the image data of at least one camera corresponding to the identified direction.

For example, when the occurrence direction of the accident risk condition is the forward direction, the vehicle may encrypt the image data obtained by the first camera 111 and store the encrypted image data in the second memory 151*b* and further encrypt the image data obtained by the third and fourth cameras 113 and 114 in the direction adjacent to the forward direction and store the encrypted image data in the second memory 151*b*.

When the occurrence direction of the accident risk condition is the rearward direction, the vehicle may encrypt the image data obtained by the second camera 112 and store the encrypted image data in the second memory 151*b* and further encrypt the image data obtained by the third and fourth cameras 113 and 114 in the direction adjacent to the rearward direction and store the encrypted image data in the second memory 151*b*.

When the occurrence direction of the accident risk condition is the right direction, the vehicle may encrypt the image data obtained by the fourth camera 114 and store the encrypted image data in the second memory 151*b* and further encrypt the image data obtained by the first and second cameras 111 and 112 in the direction adjacent to the right direction and store the encrypted image data in the second memory 151*b*.

When the occurrence direction of the accident risk condition is the left direction, the vehicle may encrypt the image data obtained by the third camera 113 and store the encrypted image data in the second memory 151*b* and further encrypt the image data obtained by the first and second cameras 111 and 112 in the direction adjacent to the left direction and store the encrypted image data in the second memory 151*b*.

When it is determined that the vehicle is in the accident risk condition, the vehicle may store the obstacle information detected by the obstacle detector 130 in the second memory 151*b* of the first storage 151 and transmit it to the server 200.

Figure 7:
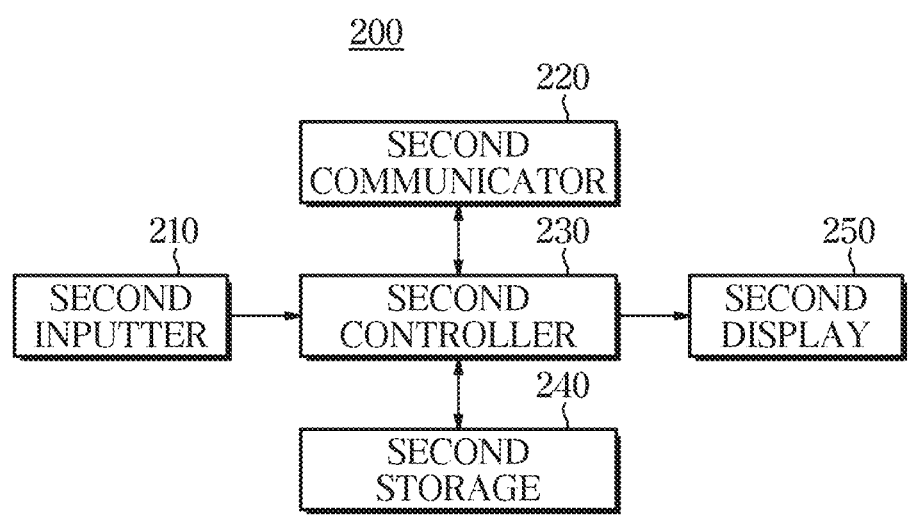
FIG. 7 is a control configuration diagram of a server that communicates with the vehicle according to an embodiment.

FIG. 7 is a control configuration diagram of a server that communicates with the vehicle according to an embodiment.

The server 200 may be a server provided in a service center, a police station server, an insurance company server, or the like for managing a plurality of vehicles.

The server 200 may include a second inputter 210, a second communicator 220, a second controller 230, a second storage 240, and a second display 250.

The second inputter 210 may receive a command for analyzing the cause of an accident.

The second communicator 220 may perform communication with the vehicle.

The second communicator 220 may receive the encrypted image data obtained by the first image obtainer 110 from the vehicle 100, receive the encrypted image data obtained by the second image obtainer 120 from the vehicle 100, receive the detection information of the obstacle detected by the obstacle detector 130, and receive the position information of the vehicle 100.

The second communicator 220 may receive operation information of the brake pedal, the accelerator pedal, and the steering wheel.

The second communicator 220 may also perform communication with a user terminal. The second communicator 220 may transmit the image data to the user terminal.

The second controller 230 may decode the encrypted image data and analyze the cause of the accident using the decoded image data.

The second controller 230 may determine an abrupt intervention of the obstacle based on the decoded image data obtained by the first image obtainer 110.

The second controller 230 may determine the cause of the accident caused by a pontoon, a bump, or a fallen tree on the road based on the decoded image data obtained by the first image obtainer 110.

The second controller 230 may recognize the driver's face based on the decoded image data obtained by the second image obtainer 120, recognize the driver's eyes on the recognized face, and track the recognized eyes in real time.

The second controller 230 may determine whether or not the driver is driving drowsy from the motion of the driver's face.

The second controller 230 may predict the concentration of the driver based on the driver's eyes. Here, the concentration means the concentration state corresponding to the concentration of the driver. In addition, the concentrated state may include a forward viewing state.

The second controller 230 may determine the driver's avoidance intention based on the operation information of the brake pedal, the accelerator pedal, and the steering wheel.

The second controller 230 may analyze the cause of the accident based on the detection information of the obstacle and the state information of the vehicle.

For example, the state information of the vehicle may include the slip of the vehicle.

When it is determined that an accident has occurred, the second controller 230 may transmit the accident information for traffic accident handling to a medical institution or police station based on the position information.

The second storage 240 may store the identification information of the vehicle.

The second storage 240 may store the encrypted image data, the detection information of the obstacle, the position information, and the like for each vehicle.

The second display 250 may display the information of the vehicle and the occurrence of the accident as the image and display an analysis result of the accident occurrence as the image.

Here, the information of the vehicle may include number information of the vehicle, vehicle type information, information of the driver of the vehicle, and the like.

As is apparent from the above description, the embodiments of the present disclosure can reduce the capacity of data stored in the storage device in the vehicle by storing image data obtained during autonomous driving in a volatile storage device and storing image data corresponding to a driving condition in a non-volatile storage device when an accident risk condition occurs, and easily grasp an accident condition when an accident occurs.

The present disclosure can further reduce the amount of data stored in the non-volatile storage device by storing only brightness data among the image data in the non-volatile storage device when the accident risk occurs and store the image data stored in the non-volatile storage device for a long period of time as the amount of data stored in the non-volatile storage device decreases.

The present disclosure can further reduce the amount of data stored in the non-volatile storage device by storing only the image data in the direction in which the accident risk occurs in the non-volatile storage device and store the image data stored in the non-volatile storage device for a long period of time as the amount of data stored in the non-volatile storage device decreases.

The present disclosure can reduce the amount of data stored in the storage device by transmitting the image data corresponding to the driving condition to a server and storing the image data in the server when the driving condition is the accident risk condition, and easily and accurately grasp the accident condition when an accident occurs.

As described above, the present disclosure can efficiently store the image data in the embedded environment by selectively encrypting and storing only a part of the image data by taking advantage of the characteristics of the image data in the compressed NAL form according to the memory limitation in the embedded environment.

The present disclosure can improve the quality and merchantability of the autonomous driving control apparatus and the vehicle having an autonomous drive function, further increase the satisfaction of the user, and ensure competitiveness of the product.

Meanwhile, the embodiments of the present disclosure may be implemented in the form of recording media for storing instructions to be carried out by a computer. The instructions may be stored in the form of program codes, and when executed by a processor, may generate program modules to perform an operation in the embodiments of the present disclosure. The recording media may correspond to computer-readable recording media.

The computer-readable recording medium includes any type of recording medium having data stored thereon that may be thereafter read by a computer. For example, it may be a Read Only Memory (ROM), a Random Access Memory (RAM), a magnetic tape, a magnetic disk, a flash memory, an optical data storage device, and the like.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

The embodiments of the present disclosure have thus far been described with reference to accompanying drawings. It will be obvious to those of ordinary skill in the art that the present disclosure may be practiced in other forms than the embodiments as described above without changing the technical idea or essential features of the present disclosure. The above embodiments are only by way of example, and should not be interpreted in a limited sense.

What is claimed is:

1. An autonomous driving control apparatus comprising:
a communicator configured to communicate with an image obtainer for obtaining an external image of the surroundings of a vehicle and an internal image of the vehicle and communicate with an obstacle detector for detecting obstacles;
a controller configured to control autonomous driving based on obstacle detection information detected by the obstacle detector and image data obtained by the image obtainer and encrypt brightness data among the image data obtained by the image obtainer during the control of the autonomous driving; and
a storage configured to store the encrypted brightness data,
wherein the storage comprises a first memory and a second memory, and
wherein the controller is configured to determine whether an accident risk condition is determined based on the obstacle detection information detected by the obstacle detector during the control of the autonomous driving, control the memory to store the encrypted brightness data in the first memory when it is determined that the accident risk condition is not present, and control the second memory to store the encrypted brightness data in the second memory when it is determined that the accident risk condition is present.

2. The autonomous driving control apparatus according to claim 1, wherein the controller is configured to identify a region of interest (ROI) from the image data, identify the sizes of macroblocks divided into different sizes based on the brightness and chrominance of the image data, and encrypt the brightness data of the macroblocks smaller than a predetermined size among the macroblocks within the identified ROI.

3. The autonomous driving control apparatus according to claim 1, wherein the first memory is a volatile memory, and wherein the second memory is a non-volatile memory.

4. The autonomous driving control apparatus according to claim 1, wherein the controller is configured to identify a region of interest (ROI) from the image data and encrypt the brightness data of the identified ROI.

5. The autonomous driving control apparatus according to claim 1, wherein the controller is configured to identify the sizes of macroblocks divided into different sizes based on the brightness and chrominance of the image data and encrypt the brightness data of the macroblocks smaller than a predetermined size among the identified macroblocks.

6. The autonomous driving control apparatus according to claim 1, wherein the communicator is configured to communicate with a server, and
wherein the controller is configured to determine whether an accident risk condition is determined based on the obstacle detection information detected by the obstacle detector during the control of the autonomous driving and control the communicator to store the encrypted brightness data in the server when it is determined that the accident risk condition is present.

7. A vehicle comprising:
a first image obtainer configured to obtain an external image;
a second image obtainer configured to obtain an internal image;
an obstacle detector configured to detect obstacles;
a controller configured to control autonomous driving based on obstacle detection information detected by the obstacle detector and image data obtained by the first image obtainer and encrypt brightness data among the image data obtained by the first and second image obtainers during the control of the autonomous driving; and
a storage configured to store the encrypted brightness data,
wherein the storage comprises a first memory and a second memory, and
wherein the controller is configured to determine whether an accident risk condition is determined based on the obstacle detection information detected by the obstacle detector during the control of the autonomous driving, control the memory to store the encrypted brightness data in the first memory when it is determined that the accident risk condition is not present, and control the second memory to store the encrypted brightness data in the second memory when it is determined that the accident risk condition is present.

8. The vehicle according to claim 7, wherein the controller is configured to identify a region of interest (ROI) from the image data, identify the sizes of macroblocks divided into different sizes based on the brightness and chrominance of the image data, and encrypt the brightness data of the macroblocks smaller than a predetermined size among the macroblocks within the identified ROI.

9. A method for controlling a vehicle comprising:
controlling autonomous driving of the vehicle based on an external image obtained by a first image obtainer and obstacle detection information detected by an obstacle detector when the vehicle is in an autonomous driving mode;
determining whether an accident risk condition is determined based on the obstacle detection information detected by the obstacle detector during the control of the autonomous driving;
encrypting and storing external image data of the vehicle obtained by the first image obtainer and internal image data of the vehicle obtained by a second image obtainer, respectively, when it is determined that the accident risk condition is present;
identifying a braking force, an acceleration amount, and a steering angle of the vehicle when it is determined that a current position is a highway;
storing the encrypted image data in a first memory when a condition that the identified braking force is equal to or greater than a reference braking force, a condition that the identified acceleration amount is equal to or greater than a reference acceleration amount, and a condition that the identified steering angle is equal to or greater than a reference steering angle are not all satisfied; and
storing the encrypted image data in the first memory when at least one of the conditions is satisfied.

10. The method according to claim 9, wherein the encrypting of the external image data of the vehicle comprises: identifying a region of interest (ROI) from the external image data of the vehicle; identifying the sizes of macroblocks divided into different sizes based on the brightness and chrominance of the image data; and encrypting brightness data of the macroblocks smaller than a predetermined size among the macroblocks within the identified ROI.

11. The method according to claim 9, wherein the encrypting of the external image data comprises:
identifying a direction in which the accident risk condition occurs when it is determined that the accident risk condition is present; and
encrypting the brightness data of the image data obtained from at least one camera installed adjacent to the direction corresponding to the identified direction among first, second, third, and fourth cameras that obtain external images of the front, rear, left, and right.

12. The method according to claim 9, further comprising:
transmitting the encrypted image data in a server when it is determined that the accident risk condition is present.

* * * * *